United States Patent
Kimura et al.

(10) Patent No.: US 7,810,111 B2
(45) Date of Patent: Oct. 5, 2010

(54) OPTICAL PICK-UP

(75) Inventors: Katsuhiko Kimura, Kasumigaura (JP); Jun Hato, Yokohama (JP)

(73) Assignee: Hitachi Media Electronics Co., Ltd., Iwate-ken (JP)

( * ) Notice: Subject to any disclaimer, the term of this patent is extended or adjusted under 35 U.S.C. 154(b) by 707 days.

(21) Appl. No.: 11/699,024

(22) Filed: Jan. 29, 2007

(65) Prior Publication Data

US 2008/0037377 A1  Feb. 14, 2008

(30) Foreign Application Priority Data

Aug. 8, 2006  (JP)  ............... 2006-215189

(51) Int. Cl.
   *G11B 7/085* (2006.01)
(52) U.S. Cl. .................................... 720/683
(58) Field of Classification Search ............... 720/683, 720/684, 681, 649
   See application file for complete search history.

(56) References Cited

U.S. PATENT DOCUMENTS

| | | | |
|---|---|---|---|
| 7,313,799 B2 * | 12/2007 | Kimura et al. | 720/683 |
| 2004/0123309 A1 | 6/2004 | Cheong et al. | |
| 2006/0083121 A1 * | 4/2006 | Kimura et al. | 369/44.14 |
| 2006/0218569 A1 * | 9/2006 | Jang et al. | 720/683 |
| 2007/0140075 A1 * | 6/2007 | Kimura et al. | 369/44.15 |

FOREIGN PATENT DOCUMENTS

| | | |
|---|---|---|
| JP | 2001-093178 | 4/2001 |
| JP | 2001-319353 | 11/2001 |
| JP | 2002-197700 | 7/2002 |
| JP | 2004-87106 | 3/2004 |
| JP | 2005-050414 | 2/2005 |

* cited by examiner

*Primary Examiner*—Allen T Cao
(74) *Attorney, Agent, or Firm*—Antonelli, Terry, Stout & Kraus, LLP.

(57) ABSTRACT

An optical pickup that can incline an objective lens in the same direction as that of a bend of an optical disc is provided.

The optical pickup includes a lens holder that holds an objective lens, focusing coils attached to the lens holder, a yoke to which magnets are attached, and inner yokes disposed opposite to the magnets via the focusing coils, and the optical pickup is structured so that a cross-sectional area of the inner yoke disposed toward the outer periphery of the optical disc is greater than a cross-sectional area of the inner yoke disposed on the inner periphery of the optical disc.

16 Claims, 8 Drawing Sheets

OPTICAL PICK-UP

FIELD OF THE INVENTION

The present invention relates to an optical pickup provided in optical disc drives for reading information recorded on a recording surface of an optical disc or for recording information thereon.

BACKGROUND ART

A conventional objective lens driving means provided in the optical pickup of an optical disc drive is composed of a moving part on which an objective lens is mounted, support members for supporting the moving part, focusing coils, tracking coils, a yoke, and magnets.

When a drive current is applied to the focusing coils, electromagnetic force is produced by the interaction of the current with the magnetic flux developed by the magnets. The electromagnetic force drives the moving part in the focusing direction, which is either toward or away from the optical disc surface. Similarly, when a drive current is applied to the tracking coils, electromagnetic force is produced by the interaction of the current with the magnetic flux from the magnets. The electromagnetic force drives the moving part in the tracking direction, which is the direction radially with respect to the optical disc.

If the optical disc is bent or obliquely mounted with respect to the optical axis of the objective lens, when the light collected by the objective lens passes through the substrate of the optical disc, coma aberration is caused, and the focusing spot spreads, resulting in a problem that information cannot be accurately recorded or read. Thus, a mechanism that adjusts inclination of the objective lens in accord with such bend or inclination of the optical disc is required.

When the vertical positional relationship between the optical disc and the objective lens is considered such that the optical disc is the top and the objective lens is the bottom, in cases in which the optical disc is bent upward, the optical disc is farther away from the objective lens, and in cases in which the optical disc is bent downward, the optical disc is closer to the objective lens. In such case, in order to focus the objective lens on the optical disc, the objective lens is moved upward in the case of the optical disc bent upward, and the objective lens is moved downward in the case of the optical disc bent downward.

In this case, if structured in such a way that the objective lens is inclined toward the inner periphery of the optical disc when moved upward in the focusing direction, and the objective lens is inclined toward the outer periphery of the optical lens when moved downward in the focusing direction, since the direction of a bend of the optical disc and the direction of inclination of the objective lens can be adjusted, influence of such bend of the optical disc can be reduced.

Patent Document 1 discloses an example of a conventional structure of such objective lens driving means of the optical pickup. In Patent Document 1, a magnetic body is disposed so that the center point of movement of the coil and the center point of the magnetic body are separated from each other in a direction perpendicular to the optical axis of the objective lens. Further, the coefficient of elasticity of the elastic members that movably connect lens supporting members that support the objective lens and a fixing member is different between the left side and the right side of the optical axis of the objective lens.

[Patent Document] JP Patent Publication (Kokai) No. 2001-93178 A (pages 3-4, FIG. 1)

SUMMARY OF THE INVENTION

Problems to be Solved by the Invention

In the above Patent Document 1, since the magnetic body is disposed so that the center thereof is shifted, and elastic members having different coefficients of elasticity are used, there is a possibility that thrust force could be decreased or the number of components could be increased.

The present invention provides an optical pickup that has a structure different from that of the above Patent Document 1 and that can incline the objective lens in the same direction as that of a bend of the optical disc.

Means of Solving the Problems

In order to achieve the above, the present invention is structured as follows:

Namely, an optical pickup according to the present invention comprises an objective lens, a lens holder that holds the objective lens, focusing coils attached to the lens holder, magnets disposed opposite to the focusing coils, a yoke to which the magnets are attached, and inner yokes disposed opposite to the magnets via the focusing coils. The optical pickup is structured so that a cross-sectional area of the inner yoke disposed toward the outer periphery of the optical lens with respect to the objective lens is greater than a cross-sectional area of the inner yoke disposed toward the inner periphery of the optical disc with respect to the objective lens. As used herein, in the present application, the cross-sectional area of the inner yoke refers to the smaller one of the area of a cross section parallel to surfaces on which the focusing coils are attached and the area of a cross section perpendicular to the optical axis of the objective lens.

EFFECTS OF THE INVENTION

In accordance with the present invention, the magnetic flux density that affects the focusing coils disposed toward the outer periphery of the optical disc with respect to the objective lens is greater than the magnetic flux density that affects the focusing coils disposed toward the inner periphery of the optical disc. Thus, the force generated at the focusing coils disposed toward the outer periphery becomes greater than the force generated at the focusing coils disposed toward the inner periphery. As a result, when the objective lens is moved in the focusing direction, it becomes possible to incline the objective lens in the same direction as that of a bend of the optical disc.

DESCRIPTION OF PREFERRED EMBODIMENTS OF THE INVENTION

Embodiment 1

An embodiment of the optical pickup according to the invention will be described with reference to the drawings.

Initially, an optical disc drive 100 in which an optical pickup 110 is mounted is described with reference to a block diagram of FIG. 8. The optical disc drive 100 comprises a spindle motor 120 for rotating an optical disc 101, an optical pickup 110 for reading or writing information on the optical disc 101, and a controller 130 for controlling these components. The optical pickup 110 comprises an objective lens driving means 50, of which the details will be described later, and optical components such as a light emitting device 111.

A disc rotation control circuit 131, which is connected to the controller 130, receives an instruction therefrom and drives the spindle motor 120 on which the optical disc 101 is mounted. A feed control circuit 132, which is also connected to the controller 130, receives an instruction therefrom and causes the optical pickup 110 to be moved radially with respect to the optical disc 101.

To the light emitting device 111 mounted on the optical pickup 110, a light-emitting device driving circuit 133 is connected. Upon instruction from the controller 130, the light-emitting device driving circuit 133 sends a drive signal to the light emitting device 111, which then emits laser light. The laser light is focused by an objective lens 1 on the optical disc 101. The thus focused laser light is reflected by the optical disc 101. The reflected light passes through the objective lens 1 and then becomes incident on a photodetector 112, which produces a detection signal 134. The detection signal 134 is sent to a servo signal detection circuit 135 and a read signal detection circuit 137. Based on the detection signal 134 sent to the servo signal detection circuit 135, a servo signal is produced and fed to an actuator driving circuit 136.

The actuator driving circuit 136 feeds a drive signal to the objective lens driving means 50 of the optical pickup so as to control the positioning of the objective lens 1.

On the other hand, based on the detection signal 134 fed to the read signal detection circuit 137, a read signal is produced, with which the information recorded in the optical disc 101 can be reproduced.

In the following, the details of the objective lens driving means 50 provided in the optical pickup 110 shown in FIG. 8 will be described.

FIG. 1 shows an exploded perspective view of the objective lens driving means 50 in the optical pickup 110 according to the present invention. In the figure, the z-direction corresponds to the focusing direction in which the objective lens 1 is moved toward or away from the optical disc surface along the optical axis of the objective lens 1. The y-direction corresponds to the tracking direction in which the objective lens 1 is moved radially with respect to the optical disc. The direction perpendicular to both the y-direction and the z-direction corresponds to the x-direction. With regard to the positional relationship between the optical disc and the objective lens in the z-direction; that is, along the optical axis of the objective lens 1, the optical disc is considered to be the top and the objective lens is considered to be the bottom.

The objective lens 1 is mounted on the upper surface of a lens holder 2. A pair of focusing coils 3a and 3b that generate driving force in the focusing direction and a tracking coil 4 that generates driving force in the tracking direction are attached to either side of the lens holder 2 that is parallel to the focusing direction and the tracking direction.

One end of each of the support members 6 is fixed to the lens holder 2, while the other end thereof is fixed to a fixing portion 7. A moving part comprising the objective lens 1, the lens holder 2, the focusing coils 3a and 3b, and the tracking coils 4 is movably supported by the fixing portion 7 via the support members 6. The focusing coils 3a and 3b and the tracking coils 4 are electrically connected to one end of the support members 6 by soldering, for example.

Magnets 11 are attached on the inside of a magnetic yoke 9, so that the magnets are opposite to the sides of the lens holder 2 parallel to the focusing direction and the tracking direction and the magnets are spaced apart from the focusing coils and the tracking coils. Each of the magnets 11 has four magnetic poles separated by borderlines in the focusing direction and the tracking direction. A single magnet magnetized with four poles or a combination of four single-pole magnets may be used as the magnets 11. Alternatively, a combination of two magnets each being magnetized with two poles may be used.

An inner yoke 10 is disposed opposite to the magnets 11 via the focusing coils 3b disposed toward the outer periphery of the optical disc with respect to the objective lens 1, and it is connected to the bottom surface of the yoke 9. Namely, the inner yoke 10 is disposed toward the outer periphery of the optical disc with respect to the objective lens 1 alone.

Electromagnetic force F generated upon application of a current I through a coil in a magnetic field having magnetic flux density B is represented by Mathematical Expression 1 when the length of the coil wire affected by the magnetic flux density B is represented by L.

$$F = I \cdot B \cdot L \qquad \text{(Mathematical Expression 1)}$$

In the present embodiment, the focusing coils 3a and 3b disposed toward the inner periphery and the outer periphery of the optical disc with respect to the objective lens 1, respectively, have a shape and size symmetrical to each other, and they have the same number of turns and the same value of resistance. The focusing coils 3a and 3b are connected in series with each other. Thus, currents flowing through the focusing coils 3a and 3b are equal, and the length of the coil wire is also equal to each other.

FIG. 2 shows how the magnetic flux density affects the focusing coils in the present embodiment. For better viewing purposes, the figure shows the focusing coils 3a and 3b, the magnets 11, the yoke 9, and the inner yoke 10.

The magnets 11 disposed toward the inner periphery and the outer periphery of the optical disc with respect to the objective lens 1 have the identical properties. The total amount of the magnetic flux from the magnets 11 disposed toward the inner periphery of the optical disc is equal to that from the magnets 11 disposed toward the outer periphery of the optical disc.

The magnetic flux from the magnets 11 affects the focusing coils 3a and 3b as it spreads in a three dimensional manner. However, in the present embodiment, since the inner yoke 10 is located toward the outer periphery of the optical disc, the magnetic flux from the magnets 11 disposed toward the outer periphery of the optical disc is converged toward the inner yoke 10. Consequently, the magnetic flux density that affects the focusing coils 3b disposed toward the outer periphery of the optical disc becomes greater than the magnetic flux density that affects the focusing coils 3a disposed toward the inner periphery of the optical disc.

Thus, force Fb generated at the focusing coils 3b disposed toward the outer periphery of the optical disc becomes greater than force Fa generated at the focusing coils 3a disposed toward the inner periphery of the optical disc, whereby the moment that inclines the objective lens 1 is generated.

Due to this moment, as shown in FIG. 3, the objective lens 1 is inclined toward the inner periphery of the optical disc when moved upward, and as shown in FIG. 4, the objective lens 1 is inclined toward the outer periphery of the optical disc when moved downward.

FIG. 5 shows a bend of the optical disc 101 and a movement of the objective lens 1. In FIG. 5(b), the objective lens 1 is located at a reference position in cases in which the optical disc 101 is not bent.

In cases in which the optical disc 101 is bent upward as shown in FIG. 5(a), the objective lens 1 is moved upward, in order to focus the objective lens 1 on the optical disc 101. Since the objective lens 1 is inclined toward the inner periphery of the optical disc 101 when moved, the direction of the bend of the optical disc 101 and that of the inclination of the objective lens 1 can be made identical.

As shown in FIG. 5(c), when the optical disc 101 is bent downward, the objective lens 1 is moved downward, in order to focus the objective lens 1 on the optical disc 101. Since the objective lens 1 is inclined toward the outer periphery of the optical disc 101 when moved, the direction of the bend of the optical disc 101 and that of the inclination of the objective lens 1 can also be made identical.

Thus, in accordance with the present embodiment, the influence of a bend of the optical disc is reduced, whereby information can be suitably recorded or read. For recording or reading, since the center of the magnet does not need to be shifted from the center of the focusing coil, the magnet can be disposed at an optimum position with respect to the focusing coil, and a decrease in thrust force is not caused. Further, since the support members having the same properties can be used, the number of component types is not increased.

Another embodiment of the present invention will be described hereafter with reference to FIG. 6. In the present embodiment, an inner yoke 10a is disposed toward the inner periphery of the optical disc with respect to the objective lens, and an inner yoke 10b is disposed toward the outer periphery of the optical disc with respect to the objective lens. A cross-sectional area Sb of the inner yoke 10b disposed toward the outer periphery of the optical disc is greater than a cross-sectional area Sa of the inner yoke 10a disposed toward the inner periphery of the optical disc. Other features are the same as those in the above embodiment, and therefore the descriptions thereof are omitted herein. With regard to the cross-sectional areas of the inner yokes shown in FIG. 6, the figure shows cases in which the area of a cross section perpendicular to the optical axis of the objective lens 1 is smaller than the area of a cross section parallel to the surfaces on which the focusing coils are attached.

By making the cross-sectional area Sb of the inner yoke 10b greater than the cross-sectional area Sa of the inner yoke 10a, it becomes possible to make the amount of magnetic flux passing through the inner yoke 10b greater than the amount of magnetic flux passing through the inner yoke 10a. Accordingly, the magnetic flux density that affects the focusing coils 3b disposed toward the outer periphery of the optical disc can be made greater than the magnetic flux density that affects the focusing coils 3a disposed toward the inner periphery of the optical disc. The operation of inclining the objective lens 1 based on the magnetic flux density is the same as that of the above embodiment.

In the present embodiment, as compared with the above embodiment, since the difference between the magnetic flux densities that affect the focusing coils 3a and 3b is small, the effect of inclining the objective lens 1 becomes small. However, since the inner yokes 10a and 10b are disposed toward the inner periphery and the outer periphery of the objective lens 1, respectively, the inner yokes function as stoppers that limit displacement of the lens holder 2 in the tracking direction.

Note that while the inner yoke 10a in FIG. 6 has a shape such that it has a uniform cross-sectional area in the z-direction, the inner yoke 10a does not necessarily have a uniform cross-sectional area; it is only necessary that the inner yoke 10a has a portion of which cross-sectional area is smaller than that of the inner yoke 10b. For example, the inner yoke 10a having a notch or an opening may be used.

Further, in the above embodiment, the focusing coils 3a and 3b are separated toward the inner periphery and the outer periphery of the optical disc, and each of the magnets 11 has four magnetic poles. However, the inventive effect obtained by disposing the inner yoke toward the outer periphery of the optical disc alone with respect to the objective lens or making the cross-sectional area of the inner yoke disposed toward the outer periphery greater than the cross-sectional area of the inner yoke disposed toward the inner periphery is not limited by the above features.

For example, as shown in FIG. 7, the present invention may be structured such that a single focusing coil 13 and single-pole magnets 21 are used and tracking coils 14 are disposed on either side of each of the magnets 21 in the tracking direction. FIG. 7 shows a structure in which the inner yoke 10 is disposed toward the outer periphery alone. Based on such structure, since the magnetic flux from the magnet 21 is also converged toward the inner yoke 10, the magnetic flux density that affects portions toward the outer periphery of the focusing coil 13 becomes greater. Thus, since the force generated at the portions toward the outer periphery of the focusing coil 13 becomes greater, the objective lens 1 can be inclined as in the above embodiments.

Thus, in accordance with the optical pickup of the present invention, without a decrease in thrust force or an increase in the number of component types, the objective lens can be inclined in the same direction as that of a bend of the optical disc. As a result, information can be accurately recorded or read on the optical disc.

INDUSTRIAL APPLICABILITY

The present invention can be used as an optical pickup in an optical disc drive.

EXPLANATION OF LETTERS OR NUMERALS

Figure 1:
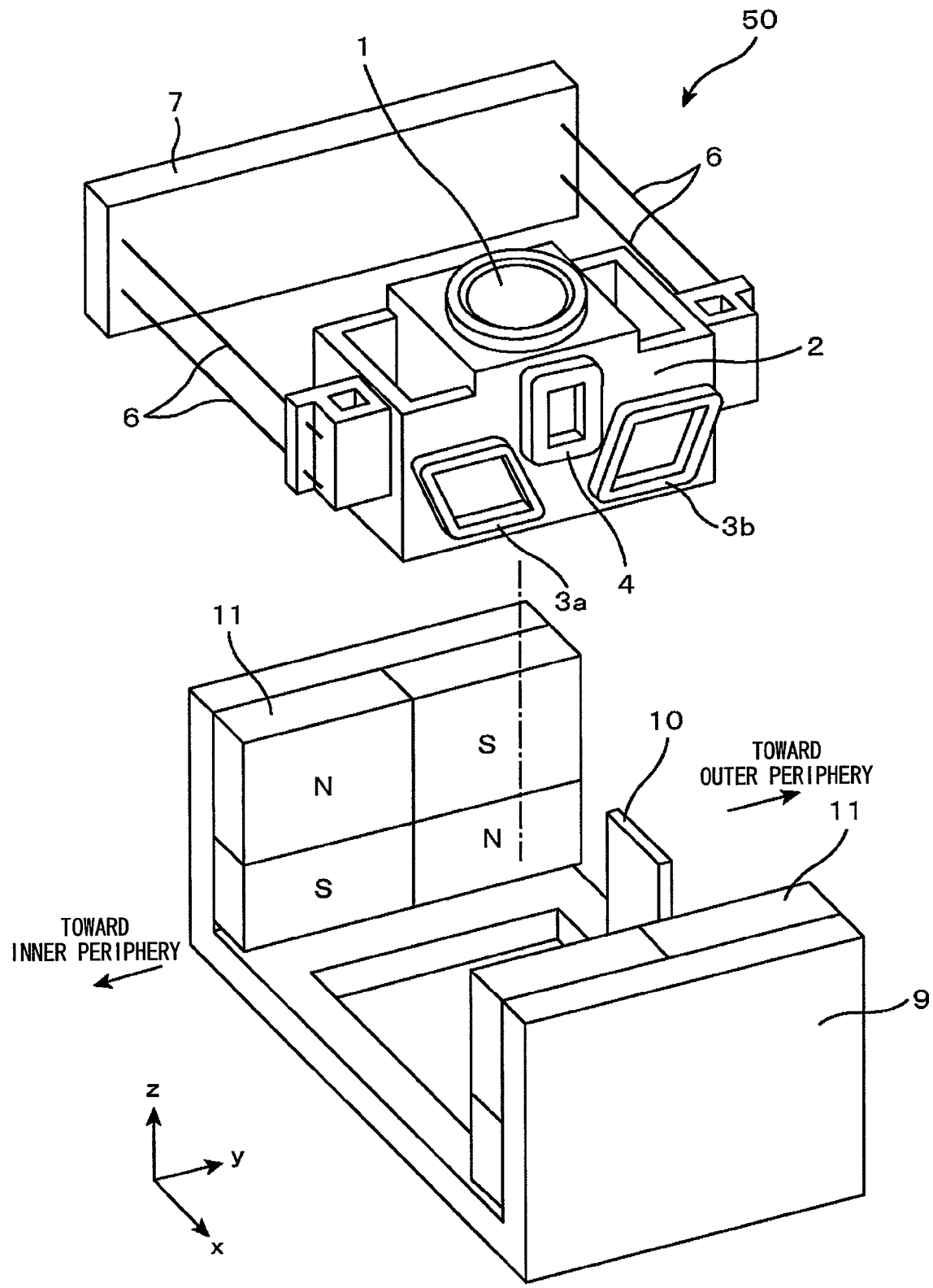
FIG. 1 shows an embodiment of an objective lens driving means of an optical pickup according to the present invention.
Figure 2:
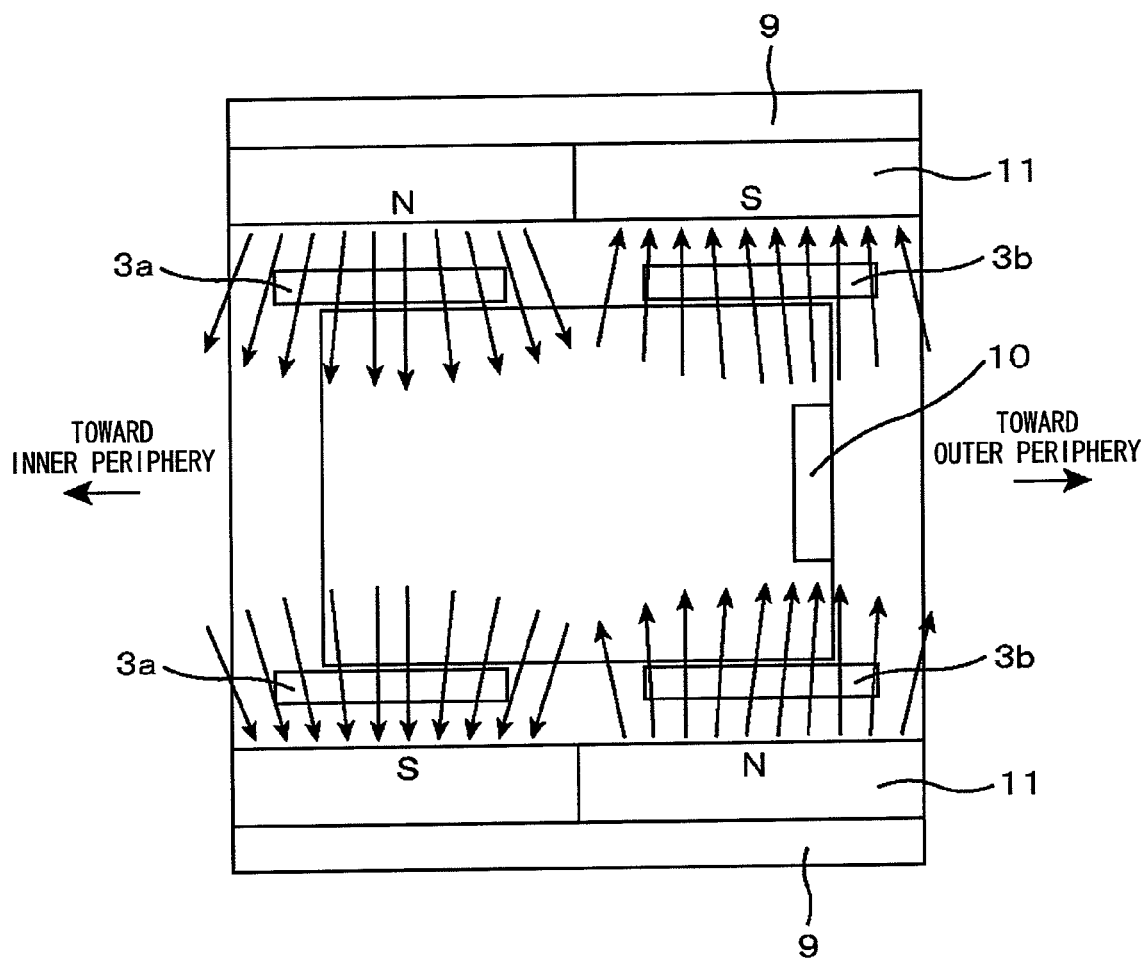
FIG. 2 shows magnetic flux density that affects focusing coils of the objective lens driving means shown in FIG. 1.
Figure 3:
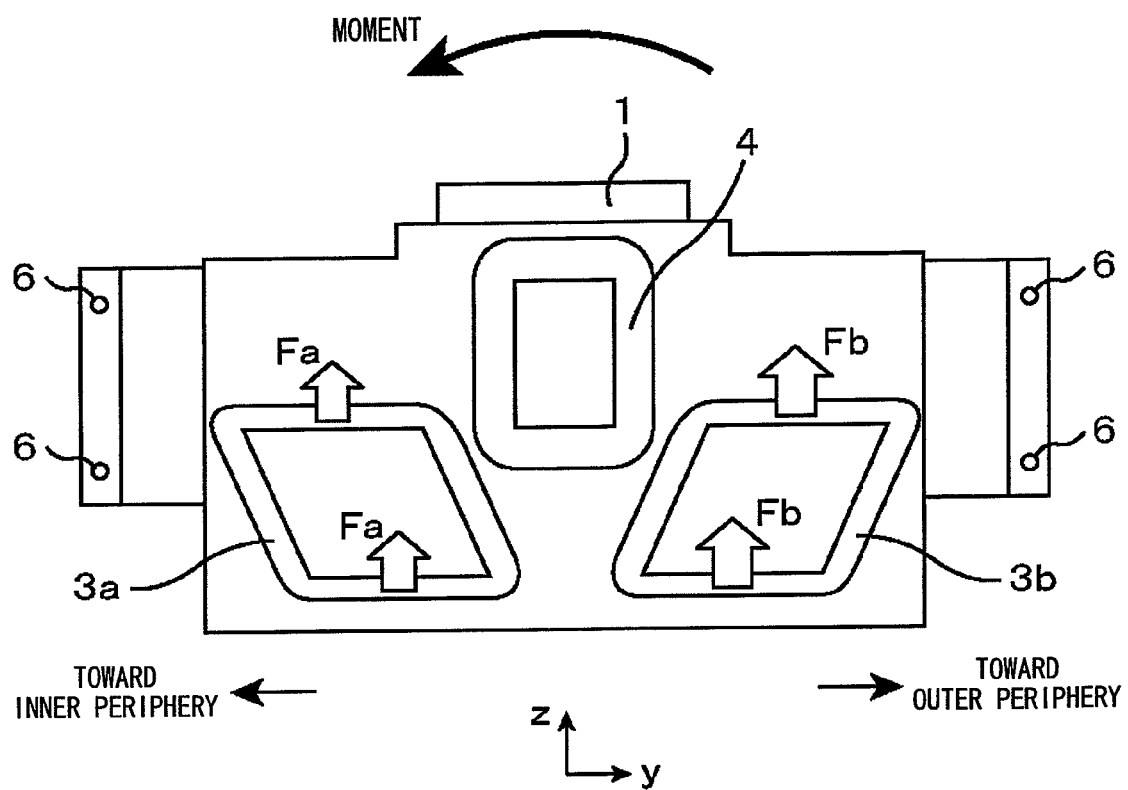
FIG. 3 shows a movement of the objective lens driving means shown in FIG. 1.
Figure 4:
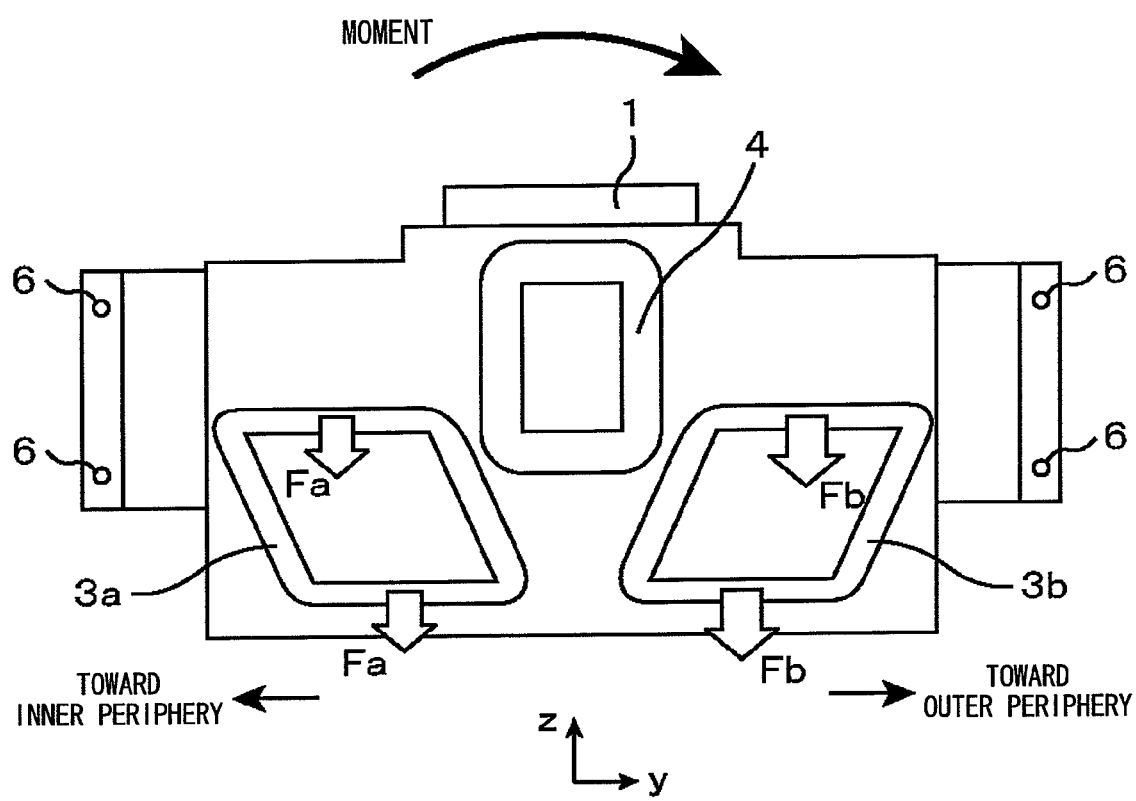
FIG. 4 shows a movement of the objective lens driving means shown in FIG. 1.
Figure 5:
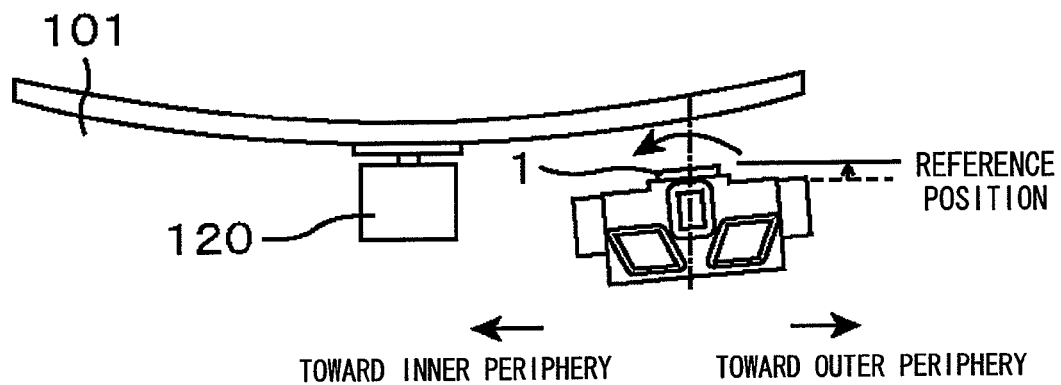
FIG. 5 shows a movement of the objective lens driving means shown in FIG. 1.
Figure 5:
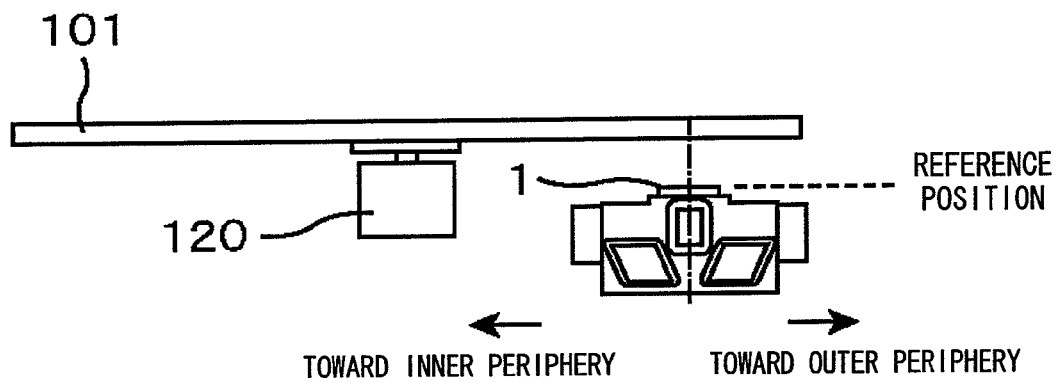
Figure 5:
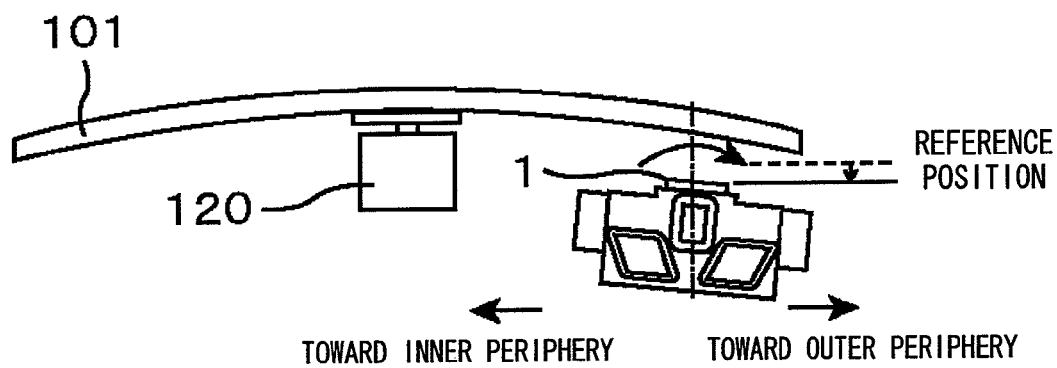
Figure 6:
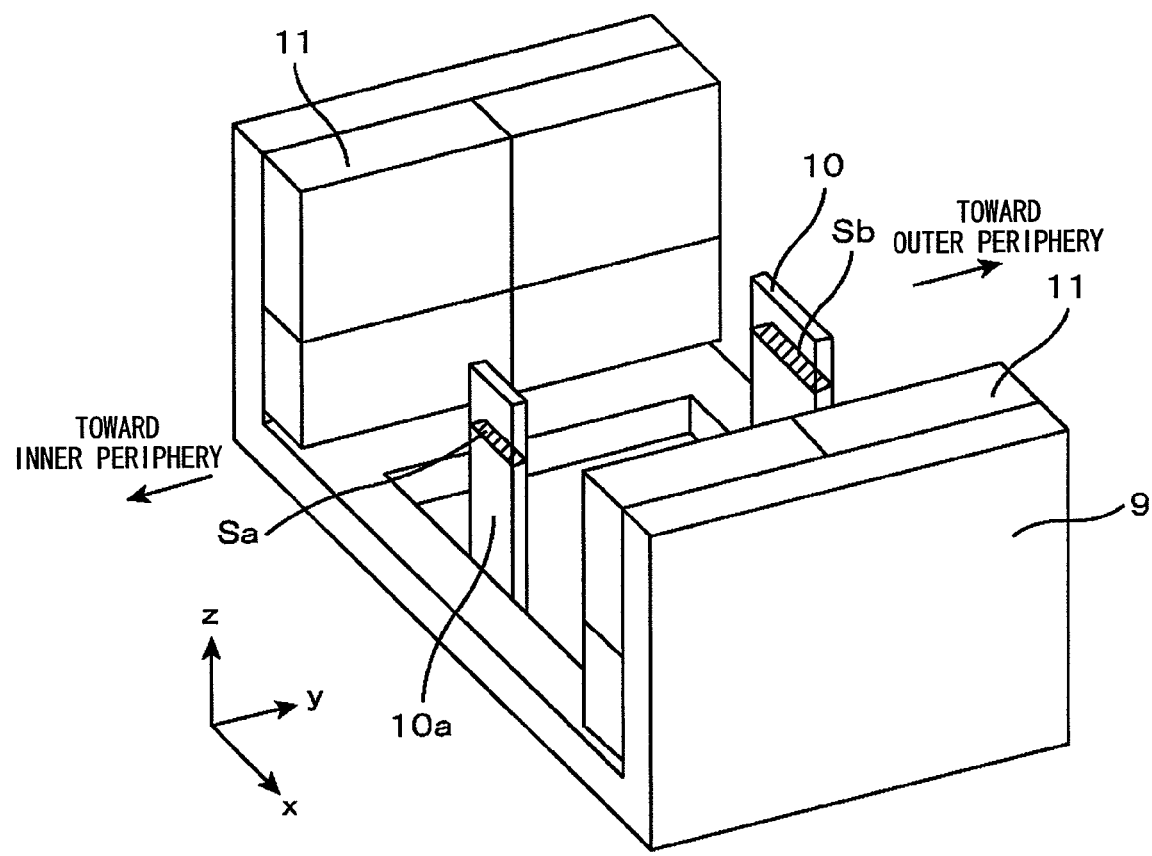
FIG. 6 shows another structure of the objective lens driving means according to the present invention.
Figure 7:
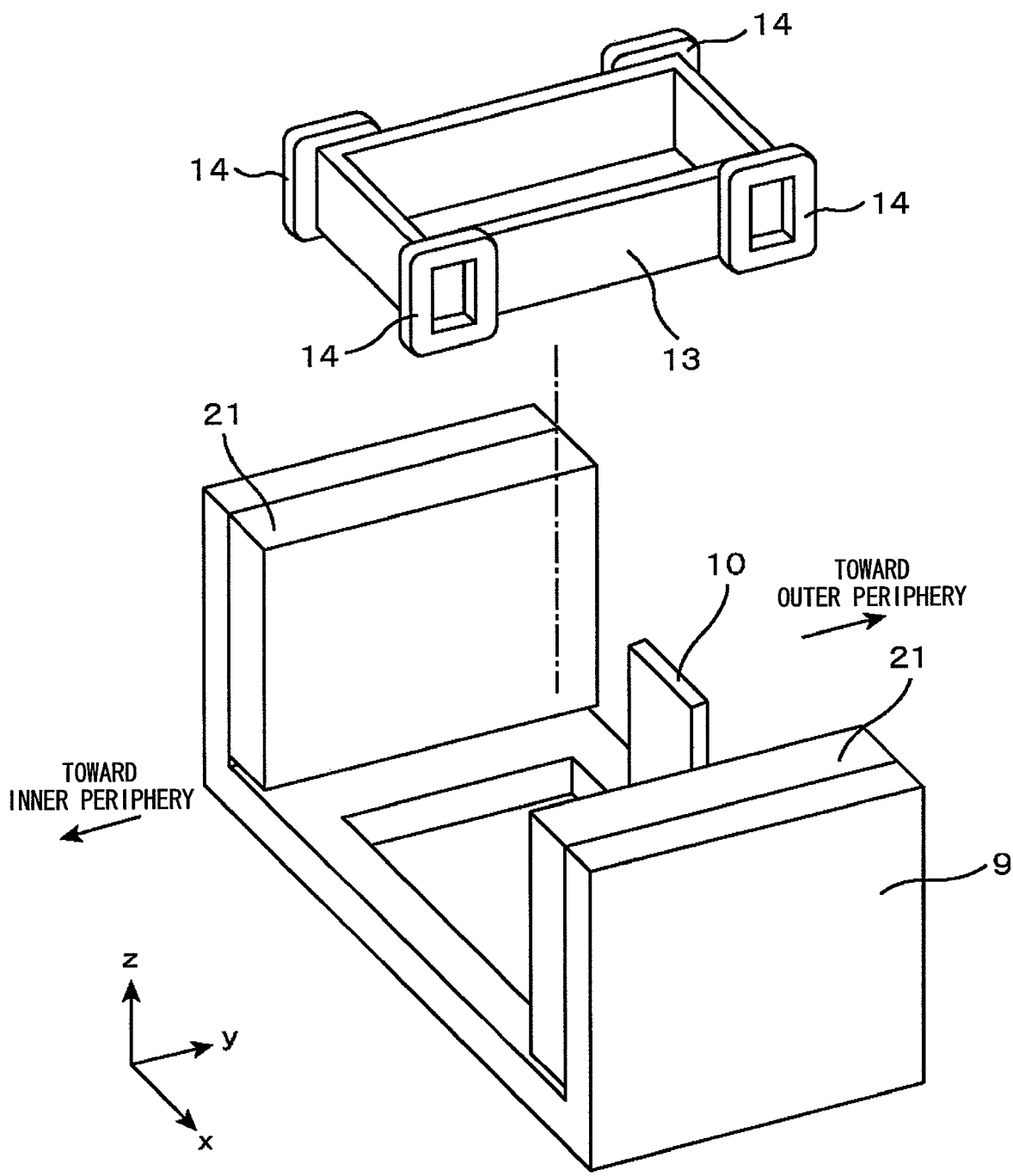
FIG. 7 shows another structure of the objective lens driving means according to the present invention.
Figure 8:
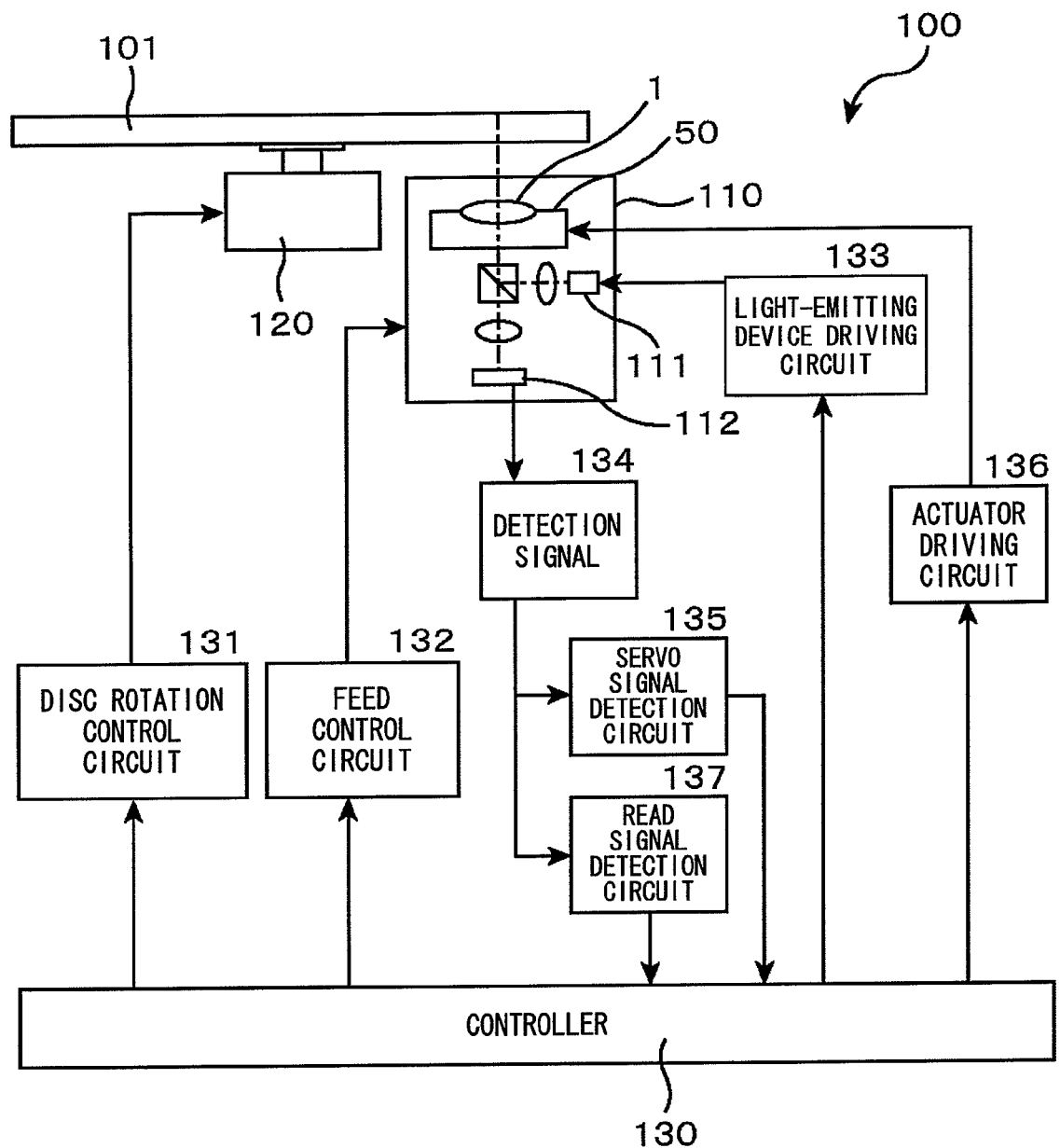
FIG. 8 shows a block diagram of an embodiment of an optical disc drive according to the present invention.

1 . . . objective lens, 2 . . . lens holder, 3a, 3b . . . focusing coils, 4 . . . tracking coil, 6 . . . support members, 7 . . . fixing portion, 9 . . . yoke, 10 . . . inner yoke, 11 . . . magnets, 50 . . . objective lens driving means, 100 . . . optical disc drive, 101 . . . optical disc, 110 . . . optical pickup, 111 . . . light emitting device, 112 . . . photodetector.

The invention claimed is:

1. An optical pickup, comprising:
an objective lens;
a lens holder which holds the objective lens;
focusing coils attached to the lens holder;
magnets disposed opposite to the focusing coils;
a magnetic yoke to which the magnets are attached; and
one or more inner yokes disposed opposite to the magnets, via the focusing coils,
wherein a cross-sectional area of an inner yoke disposed toward an outer periphery of an optical disc with respect to the objective lens is greater than a cross-sectional area of another inner yoke disposed toward an inner periphery of the optical disc with respect to the objective lens.

2. The optical pickup according to claim 1, wherein the focusing coils disposed toward the inner periphery and the outer periphery of the optical disc with respect to the objective lens have a shape and size symmetrical to each other.

3. The optical pickup according to claim 2, wherein currents flowing through the focusing coils disposed toward the inner periphery and the outer periphery of the optical disc with respect to the objective lens are equal to each other.

4. The optical pickup according to claim 3, wherein the magnets disposed toward the inner periphery and the outer periphery of the optical disc with respect to the objective lens have an identical shape, size, and properties.

5. The optical pickup according to claim 1, wherein the cross-sectional area of the inner yoke refers to the smaller one of an area of a cross section parallel to surfaces on which the focusing coils are attached and an area of a cross section perpendicular to the optical axis of the objective lens.

6. An optical pickup, comprising:
an objective lens;
a lens holder which holds the objective lens relative to an optical disc;
focusing coils arranged at both ends of the lens holder, to generate driving force in a focusing direction;
magnets disposed opposite to the focusing coils on both sides of the lens holder;
magnetic yokes to which the magnets are attached; and
an inner yoke disposed opposite to the magnets, via the focusing coils;
wherein the focusing coils are disposed toward an inner periphery and an outer periphery of the optical disc with respect to the objective lens, and
wherein the inner yoke is disposed toward an outer periphery of the optical disc with respect to the objective lens alone, such that an electromagnetic force generated at the focusing coils disposed toward the outer periphery of the optical disc becomes larger than the electromagnetic force generated at the focusing coils disposed toward the inner periphery of the optical disc in order to incline the objective lens in the same direction as that of a bend of the optical disc.

7. The optical pickup according to claim 6, wherein the focusing coils disposed toward the inner periphery and the outer periphery of the optical disc with respect to the objective lens have a shape and size symmetrical to each other.

8. The optical pickup according to claim 7, wherein currents flowing through the focusing coils disposed toward the inner periphery and the outer periphery of the optical disc with respect to the objective lens are equal to each other.

9. The optical pickup according to claim 8, wherein the magnets disposed toward the inner periphery and the outer periphery of the optical disc with respect to the objective lens have an identical shape, size, and properties.

10. The optical pickup according to claim 6, wherein the objective lens is inclined toward the inner periphery of the optical disc when the optical disc is bent upward in the focusing direction, and is inclined toward the outer periphery of the optical disc when the optical disc is bent downward in the focusing direction.

11. An optical pickup, comprising:
an objective lens;
a lens holder arranged to hold the objective lens relative to an optical disc;
focusing coils arranged at both ends of the lens holder, and disposed toward an inner periphery and an outer periphery of an optical disc with respect to the objective lens, to generate driving force in a focusing direction;
magnets disposed opposite to the focusing coils;
magnetic yokes to which the magnets are attached; and
first and second inner yokes disposed opposite to the magnets, via the focusing coils,
wherein a cross-sectional area of the first inner yoke disposed toward the outer periphery of an optical disc with respect to the objective lens is greater than a cross-sectional area of the second inner yoke disposed toward the inner periphery of the optical disc with respect to the objective lens, such that an electromagnetic force generated at the focusing coils disposed toward the outer periphery of the optical disc becomes larger than the electromagnetic force generated at the focusing coils disposed toward the inner periphery of the optical disc in order to incline the objective lens in the same direction as that of a bend of the optical disc.

12. The optical pickup according to claim 11, wherein the focusing coils disposed toward the inner periphery and the outer periphery of the optical disc with respect to the objective lens have a shape and size symmetrical to each other.

13. The optical pickup according to claim 12, wherein currents flowing through the focusing coils disposed toward the inner periphery and the outer periphery of the optical disc with respect to the objective lens are equal to each other.

14. The optical pickup according to claim 11, wherein the magnets disposed toward the inner periphery and outer periphery of the optical disc with respect to the objective lens have an identical shape, size, and properties.

15. The optical pickup according to claim 13, wherein the cross-sectional area of the inner yoke refers to the smaller one of an area of a cross section parallel to surfaces on which the focusing coils are attached and an area of a cross section perpendicular to the optical axis of the objective lens.

16. The optical pickup according to claim 11, wherein the objective lens is inclined toward the inner periphery of the optical disc when the optical disc is bent upward in the focusing direction, and is inclined toward the outer periphery of the optical disc when the optical disc is bent downward in the focusing direction.

* * * * *